Feb. 24, 1942.  F. P. MILLER  2,274,244
CUTTING BLADE ADJUSTMENT FOR BORING BARS
Filed June 14, 1938
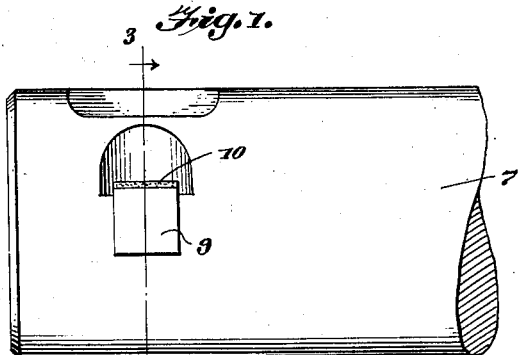
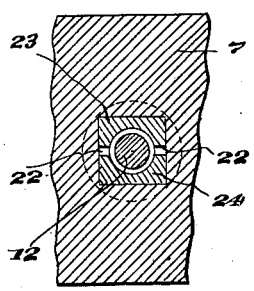
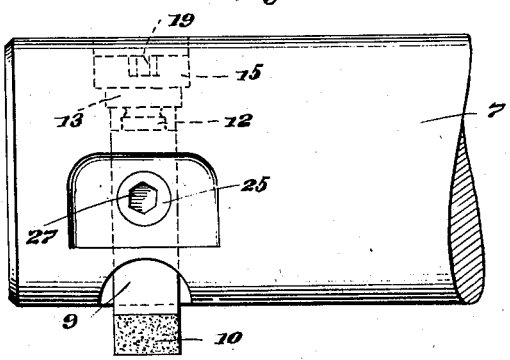
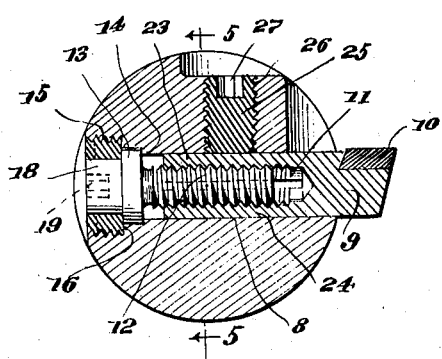
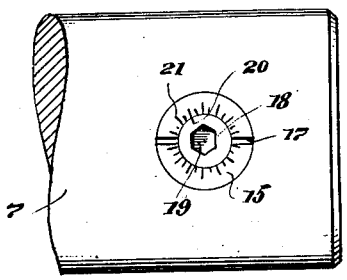
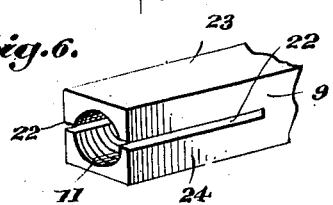
Inventor
FRANK P. MILLER
E. F. Salter
Attorney Patented Feb. 24, 1942

2,274,244

UNITED STATES PATENT OFFICE 2,274,244

CUTTING BLADE ADJUSTMENT FOR BORING BARS

Frank P. Miller, Meadville, Pa.

Application June 14, 1938, Serial No. 213,666

6 Claims. (Cl. 77—58)

This invention relates to rotary boring tools and similar appliances for use in cylindrical boring operations, in which a boring bar is provided with a radially disposed cutting blade adjustable radially of the bar.

An object of the invention is to provide in such devices means for effecting fine micrometric adjustments of a blade with respect to its support in such manner that the movement of the blade, in effecting an adjustment, is positively restricted to the extent of the exact operating movement of an adjustment effecting member.

Another object is to provide in such devices an improved means for locking a blade in its adjusted position.

Other objects will be readily apparent from the description to those skilled in the art.

In the accompanying drawing, wherein like characters of reference designate like parts throughout the several views:

Figure 1 is a side elevation of the operating end portion of a boring bar with a cutting blade adjustably positioned therein in accordance with the invention.

Figure 2 is a similar elevation but taken at right angles to Figure 1, and from above.

Figure 3 is a vertical section taken on the line 3—3 of Figure 1.

Figure 4 is a side elevation of the boring bar as viewed from the left of Figure 3.

Figure 5 is a vertical section taken on the line 5—5 of Figure 3.

Figure 6 is a perspective view of the inner end portion of the blade shank.

In detail the invention comprises a boring bar 7 having a diametrical bore 8 extending therethrough and of a cross-section suited to receive in sliding engagement the shank 9 of the cutting blade which is of corresponding cross-section. In the illustrated embodiment the blade has a tungsten carbide tip 10, but it may be of high speed steel or of the diamond point type.

The blade shank is drilled and tapped longitudinally from its inner end to provide an internally threaded socket 11 in which is engaged an adjusting screw 12 having a cylindrical enlargement 13 rotatable in a cylindrical enlargement of the bore 8. The enlargement of the bore provides a shoulder 14 which engages behind the enlargement 13 of the adjusting screw to prevent axial movement of the screw inwardly with respect to the bore 8 while permitting free rotation thereof. Outward axial movement of the adjusting screw 12 is prevented by means of a retaining nut 15 threaded into a further enlargement of the bore 8, which further enlargement terminates in a second shoulder 16 serving as a stop to limit inward movement of the retaining nut and thus preventing any possibility of its binding so tightly against the enlargement 13 of the adjusting screw as to prevent its free rotation. The outer face of the retaining nut 15 is formed with diametrical tool receiving slots 17.

The adjusting screw 12 is formed with a cylindrical head 18 having a rotatable bearing in a cylindrical bore formed through the retaining nut 15. At its outer end, which preferably lies flush with the outer face of the retaining nut, the adjusting screw head 18 is provided with a tool engageable socket 19, preferably a hexagonal socket for taking a "hex" wrench, whereby the screw 12 may be rotated to retract or advance the blade shank radially of the boring bar. The outer face of the adjusting screw head is provided with a marker 20 which cooperates with the indices of a micrometer scale 21 arranged on the retaining nut 15.

A feature of the invention resides in the means by which the shank of the cutting blade may be locked in its adjusted position. The socket portion 11 of the blade shank is diametrically split or slotted as at 22 in the diametrical plane of the bore 8 to provide the split sections 23 and 24. Bearing against the upper flat face of the section 23 is a locking screw 25 threaded in a socket 26 whose axis is perpendicular to the axis of the blade shank bore 8.

The head of the locking screw 25 is formed with a tool socket 27. At its bottom or inner end the locking screw bears flatly against the adjacent flat face of the section 23, so that, when the locking screw is advanced in its socket, it exerts a lateral pressure on the split sections 23 and 24 of the blade shank, forcing them tightly against the adjusting screw and causing the mating threads to become very tightly engaged, thus locking the blade in its position of adjustment as determined by operation of the adjusting screw.

The lateral pressure exerted by the locking screw can be made sufficiently great to preclude rotation of the adjusting screw, and the consequent tight mating engagement of the threads on the screw and the blade shank socket prevents any possibility of axial movement of the blade, thus eliminating the factor of loose play and backlash. Also, the locking screw will force the entire tool bit and adjusting screw assembly down into locking engagement with the bottom side of the bore 8.

When it is desired to effect an adjustment of the blade, the locking screw 25 is loosened only sufficiently to permit rotation of the adjusting screw 12. The braking effect, or drag, of the locking screw acting through the split sections of the blade shank on the adjusting screw enables an extreme nicety of adjustment with respect to the micrometer scale 21 for it insures that the cutting blade can only be moved the exact distance determined by the theoretical helical angle of the threads, there being no looseness or end play in the fit of the thread to be compensated.

Having thus described the invention, what is claimed is:

1. In a boring apparatus, a boring bar having a diametrical bore extending therethrough, a cutting blade having a shank slidable axially in said bore, the inner end of the blade shank having a threaded axial socket therein, an adjusting screw engaged in said socket, means on said boring bar preventing axial movement of said screw while permitting free rotation thereof, a locking screw in said boring bar and operable to exert lateral pressure on the blade shank at its threaded socket portion, and said threaded socket portion of the blade shank being split diametrically in a plane perpendicular to the axis of said locking screw so that it will be bodily contracted under pressure exerted by said locking screw.

2. In a boring apparatus, a boring bar having a diametrical bore extending therethrough, a cutting blade having a shank slidable axially within said bore, the inner end portion of the blade shank having a threaded axial socket therein, an adjusting screw in threaded engagement with the blade shank socket, a retaining nut threaded in one end of said bore and engaging said screw to prevent its axial movement while permitting its free rotation, said screw having a head extending through said nut, cooperating scale means on said screw head and nut, a locking screw in said boring bar and operable to engage the blade shank laterally at its threaded socket portion, and said shank socket portion being split longitudinally from its inner end.

3. In combination with a boring bar having a blade shank receiving bore extending therethrough, an adjusting screw extending axially into said bore at one end, means retaining said screw against axial movement while permitting rotation thereof, and a locking screw operable to project into said bore perpendicular to the bore axis; a cutting blade having a shank slidable axially in said bore and provided with a threaded socket extending longitudinally from its inner end to take over said adjusting screw, and said threaded socket portion of said blade being laterally engaged by said locking screw and split diametrically in a plane perpendicular to the axis of said locking screw.

4. In a boring tool, a boring bar having a diametrical bore extending therethrough of polygonal cross-section through the major portion of its length, said bore adjacent one end being laterally enlarged to provide a stop shoulder and an axial extent of circular cross-section therebeyond, said bore being further laterally enlarged at its end to provide a second stop shoulder and a socket of circular cross-section therebeyond, said socket being screw threaded, a retaining nut threaded in said socket to abut said second stop shoulder and having an axial bore therethrough, an adjusting screw having an annular lateral enlargement rotatable in the enlargement of the boring bar bore between said first named stop shoulder and the retaining nut, said screw having a head disposed in the bore of said retaining nut and rotatable therein, cooperating scale means on said head and retaining nut, a cutting blade having a shank slidable axially in the bore of the bar and of a cross-section conforming to the cross-section of the bore, said blade shank having an axial screw threaded socket opening from its inner end to take over said adjusting screw, the walls of said blade shank socket being split longitudinally, and a locking screw in the boring bar operable laterally against a wall of the blade shank socket.

5. In combination with a boring bar having a blade receiving bore, a blade adjustably mounted in said bore, the inner end portion of said blade being provided with a threaded axially extending diametrically split cylindrical socket adapted to be bodily contracted under pressure, an adjusting screw threadedly engaged in said socket, and means for applying pressure to the threaded socket portion of said blade to contract the same upon said adjusting screw and thereby establish tight mating engagement of the threads of the screw and blade socket.

6. In combination with a boring bar having a radial blade receiving bore, a blade adjustably mounted in said bore and having its inner end portion provided with a threaded axially extending diametrically split cylindrical socket adapted to be bodily contracted, an adjusting screw threadedly engaged in said socket, means on said bar preventing axial movement of said adjusting screw while permitting rotation thereof, and a blade locking screw threaded in said bar and engageable with the threaded socket portion of said blade to contract the same upon said adjusting screw and thereby establish tight mating engagement of the threads of the screw and blade socket throughout substantially the circumferential extent thereof.

FRANK P. MILLER.